Patented Dec. 8, 1942

2,304,297

UNITED STATES PATENT OFFICE 2,304,297

ART OF UTILIZING MOLYBDENUM

Nicholas Anton, Brooklyn, N. Y., assignor to Amperex Electronic Products, Inc., Brooklyn, N. Y., a corporation of New York No Drawing. Application May 12, 1939, Serial No. 273,189

8 Claims. (Cl. 49—92)

This invention relates to improvements in the use of molybdenum and more particularly to the use of molybdenum as conductors for sealing into glass such as lead-in conductors in vacuum tubes, although it is not limited thereto and contemplates other uses of molybdenum treated to have the characteristics disclosed herein.

The physical and electrical characteristics of molybdenum make it desirable for use with certain types of glass in the construction of vacuum tubes. Previous attempts to use molybdenum for such purposes, however, have not been as satisfactory as desired and consequently molybdenum has found only very little commercial use for such purposes.

The difficulty arises from the comparatively high speed of oxidizing of molybdenum which necessitates a very careful technique in making the seal. The heating of the molybdenum necessary to seal the glass to it, results in an over-oxidation of the molybdenum, unless certain precautions are taken, and this in turn prevents the production of a satisfactory seal, the excess oxide apparently forming a permeable layer between the metallic molybdenum and the glass through which layer air can penetrate.

It is an object of this invention to provide a method for treating molybdenum which, while preserving the advantages of molybdenum heretofore recognized for such purposes, reduces or eliminates the difficulty of excess oxidation.

Another object of my invention is to provide a seal of glass and molybdenum which is not subject to the difficulties of production heretofore characteristic of such seals.

Still a further object of my invention is to provide a new article of manufacture consisting of molybdenum so treated as to retard its oxidation rate and make its use possible under circumstances where heretofore such use has been impractical or impossible.

Still other objects and advantages of my invention will be apparent from the specification.

In this application I have particularly pointed out and distinctly claimed the part, improvement or combination which I claim as my invention or discovery and I have explained the principles thereof and the best mode in which I have contemplated applying those principles so as to distinguish my invention from other inventions.

In making a good seal between metal and glass a number of factors are involved. Experience has shown that either too much or too little oxide on the metal may spoil the seal. The coefficient of expansion of the metal and of the glass should be as nearly alike over the entire temperature range likely to be encountered as is possible, in order to prevent excessive strains being set up which would tend to crack the seal. In case these coefficients of expansion are not the same for all temperatures likely to be encountered, which is practically always the case, then a greater difference in expansion coefficients can be tolerated in the case of small wire than in the case of large and heavy wire or plates or rods. The reason for this is that a large or heavy rod or plate will develop a considerably greater force upon expansion or contraction than a small wire.

Glasses which are suitable in physical constants for sealing to molybdenum are those having a coefficient of expansion lying between $3.5 \times 10^{-6}$ to $5.0 \times 10^{-6}$ per degree C. With relatively large rods, for example, up to the order of a quarter of an inch in diameter, it is desirable to use glass having a temperature coefficient of expansion from about $4.6 \times 10^{-6}$ to about $5.0 \times 10^{-6}$ per degree C. For small wires, glass having a coefficient of expansion of from $3.0 \times 10^{-6}$ or $3.5 \times 10^{-6}$ may be used. Such glasses are obtainable from Corning Glass Works, Corning, New York, under the designation of G-71 and 705AJ.

Attempts in the past to seal molybdenum to such glasses have not been commercially successful or practical because of the difficulty of preventing excess oxidation of the molybdenum during the heating operation, this requiring a very careful technique, in which the molybdenum may be surrounded by a relatively long glass tube while being worked to prevent access of too much oxygen to the hot metal, or other precautions being taken to prevent the production of excess oxide. These precautions are uneconomical and in many cases interfere with the desired operation and have prevented much use of molybdenum as a sealed conductor.

According to my invention, instead of preventing access of oxygen by a special technique to the molybdenum being worked into a seal, as is the prior practice, I treat the molybdenum to slow the rate of oxidation of its surface sufficiently so that the necessary heating can be done without the production of excess oxide, and in a manner which still permits the formation of enough oxide to form a good seal.

I have found that alloying or combining a small amount of chromium with molybdenum serves to reduce the rate of oxidation as desired. The amount of chromium to be added is not critical. For relatively small leads, such as may be used in small tubes not required to carry any considerable load, and in which the time necessary for the material to be heated to make the seal is relatively short, I have found that chromium added in proportions varying from about one-half percent to about two percent produces a wire which may be readily sealed to glasses of the character described without the special oxide control technique heretofore necessary, and without the production of excess oxide, and the combination gives an excellent seal.

For larger leads such as rods up to a quarter of an inch in diameter and for drawn cups up to several inches in diameter, which are customarily drawn from sheet stock, which require to be heated for a longer time to perform the sealing operation, it may be desirable to increase the percentage of chromium to as much as five percent, but it will seldom be necessary to go beyond this amount. In the latter instance, the addition of these amounts of chromium is likely to reduce the ductility of molybdenum and, to prevent this from occurring, or to prevent it from occurring to an excessive or undesired degree, I may add to the mixture a small amount of nickel which may be the same percentage as that of the chromium added. I find that this maintains the ductility of the molybdenum without interfering with the action of the chromium in slowing the oxidation rate, so that it is possible to produce excellent seals with rods of this size without taking the usual precautions against oxidation heretofore required.

I have also found that very satisfactory results may be obtained by electroplating chromium in the form of a thin surface layer of skin upon the molybdenum in a metallic state. Seals made between molybdenum electroplated with chromium as above described show on examination the characteristic greenish color of chromium oxide interspersed with the brownish color of molybdenum oxide when the layer of chromium is kept relatively thin. It is possible, however, by increasing the thickness of the layer of chromium electroplated upon the molybdenum to a sufficient value, to produce a seal which appears to be almost entirely or completely made up of chromium oxide.

I have also found that a slowing of the rate of oxidation may be obtained by alloying small quantities of aluminum with molybdenum.

It will be apparent that molybdenum treated as described is capable of other uses than as seals, and particularly under conditions which otherwise would result in a rapid oxidation of the metal, such, for instance, as in electric heating elements.

I do not wish to be bound to any particular theory as to why the above noted results are produced. The facts have been determined experimentally and I believe the explanation to be that the addition of the metals noted, in the ways noted, results in the production of at least a surface layer or skin of readily oxidizable metal which, when heated, forms a layer or skin of self-protecting oxide serving to prevent or retard further oxidation.

It may be noted that my invention is applicable not only to conventional type seals in which no deformation of the metal is contemplated, but also to so-called "Housekeeper" type seals in which the metal is made so thin that appreciable deformations of it may occur without affecting the seal.

While I have described certain preferred embodiments of my invention, it will be understood that modifications and changes may be made without departing from the spirit and scope thereof as will be clear to those skilled in the art.

I claim:

1. The combination with a container consisting of a glass having a coefficient of expansion lying within the limits of $3.5 \times 10^{-6}$ to $5.0 \times 10^{-6}$ per degree C., of a conductor sealed thereto comprising molybdenum in major proportions and chromium in minor proportions, the chromium forming a layer of oxide interposed between the inner surface of the glass seal and the molybdenum.

2. The combination with a container consisting of a glass having a coefficient of expansion lying within the limits of $3.5 \times 10^{-6}$ to $5.0 \times 10^{-6}$ per degree C., of a conductor sealed thereto comprising not less than 90% molybdenum, and chromium not to exceed 5%, the chromium forming a layer of oxide interposed between the inner surface of the glass seal and the molybdenum.

3. The combination with a container consisting of a glass having a coefficient of expansion lying within the limits of $3.5 \times 10^{-6}$ to $5.0 \times 10^{-6}$ per degree C., of a conductor sealed thereto comprising molybdenum in major proportions and chromium and nickel in minor proportions, the chromium forming a layer of oxide interposed between the inner surface of the glass seal and the molybdenum.

4. The combination with a container consisting of a glass having a coefficient of expansion lying within the limits of $3.5 \times 10^{-6}$ to $5.0 \times 10^{-6}$ per degree C., of a conductor sealed thereto comprising molybdenum in major proportions and chromium and nickel in minor proportions, the proportions of chromium and nickel being substantially equal, the chromium forming a layer of oxide interposed between the inner surface of the glass seal and the molybdenum.

5. An electric heating element capable of use under conditions which would otherwise result in rapid oxidation of the element, consisting of a metallic conductor, said conductor comprising molybdenum in major proportions, and chromium and nickel in minor proportions.

6. An electric heating element capable of use under conditions which would otherwise result in rapid oxidation of the element, consisting of a metallic conductor, said conductor comprising molybdenum in major proportions, and chromium and nickel in minor proportions, the proportions of chromium and nickel being substantially equal.

7. The combination with a container consisting of a glass having a coefficient of expansion lying within the limits of $3.5 \times 10^{-6}$ to $5.0 \times 10^{-6}$ per degree C., of a conductor sealed thereto said conductor having a core of molybdenum having a surface layer of chromium thereon, said chromium forming a layer of oxide interposed between the inner surface of the glass seal and the molybdenum.

8. The combination with a container consisting of a glass having a coefficient of expansion lying within the limits of $3.0 \times 10^{-6}$ to $5.0 \times 10^{-6}$ per degree C., of a conductor sealed thereto comprising molybdenum in major proportions, and chromium and nickel not to exceed substantially 5 percent each, the chromium forming a layer of oxide interposed between the inner surface of the glass seal and the molybdenum.

NICHOLAS ANTON.